June 11, 1929.  R. B. CONEY  1,716,685
SAFETY DEVICE
Filed April 27, 1927
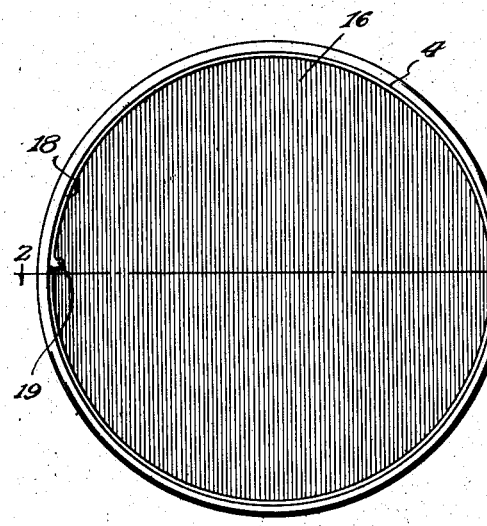
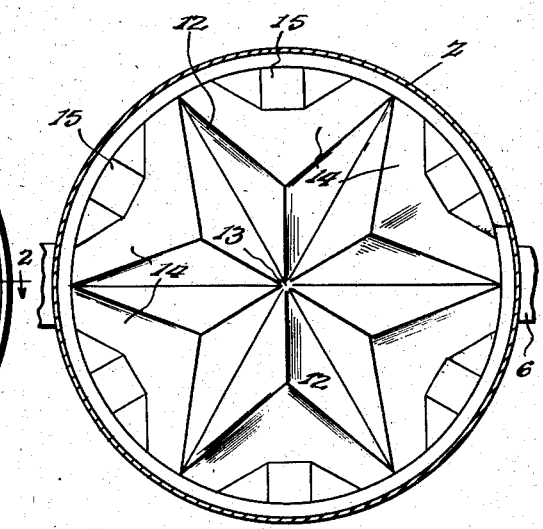
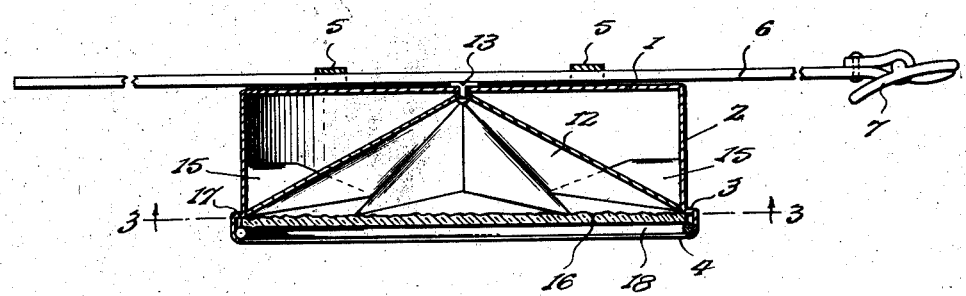
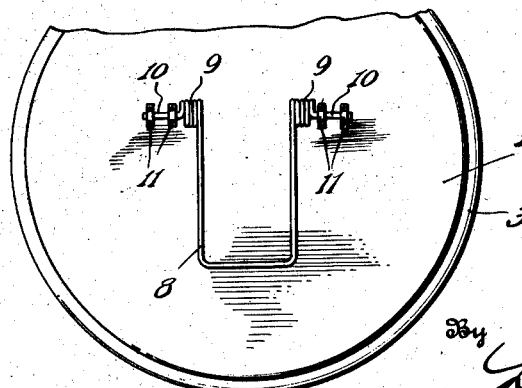
Inventor
R. B. Coney.
By Lacey & Lacey, Attorneys Patented June 11, 1929.

1,716,685

UNITED STATES PATENT OFFICE.

RALPH B. CONEY, OF HORSEHEADS, NEW YORK.

SAFETY DEVICE.

Application filed April 27, 1927. Serial No. 186,996.

This invention relates to safety devices and more particularly to a reflector which may be worn by a person or attached to the rear of a wagon or other vehicle and by reflecting rays from the headlights of an automobile prevent danger due to the driver of an automobile failing to see a person or vehicle ahead of him. It very often happens that on dark nights the driver of an automobile moving along a road will fail to see a person or unlighted vehicle ahead of him in time to avoid a collision, and it is, therefore, one object of the invention to provide a device which may be secured to the back of a vehicle or to a person by a waist-encircling strap and by reflecting the rays from the headlights of an automobile warn the driver thereof and prevent collisions.

Another object of the invention is to provide the device with an improved reflector having a multiplicity of surfaces disposed in such angular relation to each other that there will be no danger of the rays of light reflected therefrom not being seen by the driver of the automobile.

Another object of the invention is to mount the reflector in a frame or casing which will serve to protect it from being bent out of the proper shape and also prevent it from quickly becoming tarnished.

Another object of the invention is to so form the casing that a sheet of colored glass may serve as a closure for one end thereof and thereby cause the device to reflect a red light which will serve very effectively as a warning to the driver of an automobile.

The invention is illustrated in the accompanying drawing, wherein

Figure 1 is a view showing the improved safety device in end elevation;

Fig. 2 is a transverse sectional view taken through the device on the line 2—2 of Fig. 1 with a waist-encircling belt applied thereto;

Fig. 3 is a vertical sectional view taken on the line 3—3 of Fig. 2 and

Fig. 4 is a view in elevation illustrating a modified form of safety device adapted to be applied to a vehicle instead of a person.

The safety device constituting the subject-matter of this invention includes a casing preferably formed of metal and having an inner wall 1 and a marginal wall 2 which extends about the periphery of the wall 1. The casing is open at its outer end and adjacent this open outer end of the casing the peripheral wall 2 is offset outwardly to form a seat 3 and further bent to form a lip 4 disposed in overhanging relation to the seat 3, as shown in Fig. 2. Eyes have been shown carried by the wall 1 in Fig. 2 so that a waist-encircling belt 6 may be slidably connected with the casing, and this belt is provided with a buckle 7 so that the belt may be secured about the waist of a person and support the casing against the person's back. When so applied, there will be no danger of the driver of an automobile failing to see a person walking upon a road ahead of him as the rays from the headlights of the automobile will be reflected in a manner to be more fully explained and thereby give ample warning. In Fig. 4, the eyes 5 are omitted and a spring clip 8 substituted therefor. This clip 8 which is substantially U-shaped is formed of resilient wire and has its arms bent to provide coiled springs 9 from which extend fingers 10 firmly secured to the wall 1 of the casing by small brackets 11. A casing provided with the clip 8 may be readily applied to the rear portion of a horse-drawn vehicle or the like and serve as a rear light to be illuminated by rays from the headlights of an approaching automobile. It will be obvious that the casing may be provided with both the eyes 5 and the clip 8 if so desired and thereby permit it to be used either as a safety appliance for a person or as a rear light for a horse-drawn vehicle.

A reflector 12 is disposed within the casing and is preferably formed of sheet metal having a shiny surface, although other materials may be employed and covered with a substance which will reflect light. The reflector is stamped or molded to provide a multiplicity of surfaces disposed in angular relation to each other in order to provide a very efficient reflecting surface and in the present form the intermediate portion of the reflector is star-shape and tapers towards the wall 1 to which it is secured by a fastener 13 passed through the center of the star and through the wall 1, as shown in Fig. 2. Flat surfaces 14 form a border for the star-shaped central portion and between the points of the star-shaped central portion the marginal portion of the reflector has been bent to provide depressed portions 15 which together with the ends of the flat surfaces 14 bear against the annular wall 2 of the casing and serve to retain the reflector in its proper position within the casing as well as constituting light reflecting surfaces. It will thus be seen that the reflector is so formed that it will very effectively reflect the rays from an automobile headlight and there will be no danger of the driver not being warned and accidentally colliding with a person or vehicle ahead of him.

The open outer end of the casing is closed by a transparency 16, preferably consisting of a sheet of glass, although celluloid or the like may be employed if so desired. This sheet 16 is preferably colored red, and therefore the light reflected from the reflector 12 will appear red. It should also be noted that the inner surface of the sheet of glass 16 has been roughened, as shown in Fig. 2, in order to cause the device to reflect a better light when acted upon by rays from an automobile headlight. A gasket 17 is disposed between the glass 16 and seat 3 of the casing and in order to hold the glass firmly against the gasket and thereby prevent the glass from moving and also prevent dust from entering the casing about the edges of the glass there has been provided a retaining ring 18 formed of resilient wire and having one end portion bent, as shown at 19 in Fig. 1, so that the split ring may be easily removed when it is necessary to clean the glass or reflector or replace a broken glass with a new one.

Having thus described the invention, I claim:

1. A safety device comprising a casing open at its outer end, and a reflector in said casing tapered inwardly with its marginal portions bearing against said walls of the casing and secured at its center, said reflector being crimped to provide a central portion having a multiplicity of faces disposed in angular relation to each other and a border surrounding the central portion, the border being flat throughout the major portion of its area but having portions constituting angularly disposed faces spaced from each other circumferentially of the border.

2. A safety device comprising a casing open at its outer end, and a reflector in said casing tapered inwardly with its marginal portions bearing against walls of the casing and secured at its center, said reflector being crimped radially to provide a star-shaped central portion having faces disposed diagonally of each other, a flat border surrounding the said star-shaped portion, and depressed portions between the points of the star-shaped portion having faces disposed in angular relation to each other.

In testimony whereof I affix my signature.

RALPH B. CONEY. [L. S.]